(12) United States Patent
Gupta et al.

(10) Patent No.: US 11,068,286 B2
(45) Date of Patent: Jul. 20, 2021

(54) SMART CONTEXT AWARE SUPPORT ENGINE FOR APPLICATIONS

(71) Applicant: ORACLE INTERNATIONAL CORPORATION, Redwood Shores, CA (US)

(72) Inventors: Kapil Gupta, Hyderabad (IN); Vinay Chappidi, Hyderabad (IN); Arvind Subramanian, Hyderabad (IN)

(73) Assignee: Oracle International Corporation, Redwood Shores (CA)

( * ) Notice: Subject to any disclaimer, the term of this patent is extended or adjusted under 35 U.S.C. 154(b) by 85 days.

(21) Appl. No.: 16/000,990

(22) Filed: Jun. 6, 2018

(65) Prior Publication Data

US 2019/0377588 A1     Dec. 12, 2019

(51) Int. Cl.

| | |
|---|---|
| *G06F 9/451* | (2018.01) |
| *G06F 3/0484* | (2013.01) |
| *G06F 16/93* | (2019.01) |
| *G06F 16/2457* | (2019.01) |
| *G06F 3/0489* | (2013.01) |
| *G06F 16/00* | (2019.01) |
| *G06F 3/048* | (2013.01) |
| *G06F 16/24* | (2019.01) |
| *G06F 40/205* | (2020.01) |

(Continued)

(52) U.S. Cl.
CPC .............. *G06F 9/453* (2018.02); *G06F 3/048* (2013.01); *G06F 3/0484* (2013.01); *G06F 3/04895* (2013.01); *G06F 16/00* (2019.01); *G06F 16/24* (2019.01); *G06F 16/24578* (2019.01); *G06F 16/93* (2019.01); *G06F 40/205* (2020.01); *G06F 40/242* (2020.01); *G06F 40/284* (2020.01)

(58) Field of Classification Search
CPC .......... G06F 16/00; G06F 16/24; G06F 3/048; G06F 3/0484; G06F 3/04895; G06F 9/453

See application file for complete search history.

(56) References Cited

U.S. PATENT DOCUMENTS

| | | | | |
|---|---|---|---|---|
| 6,307,544 B1 * | 10/2001 | Harding | ................... | G06F 9/453 715/709 |
| 7,594,176 B1 * | 9/2009 | English | ................... | G06F 9/453 715/708 |

(Continued)

*Primary Examiner* — Cesar B Paula
*Assistant Examiner* — Sajeda Muhebbullah
(74) *Attorney, Agent, or Firm* — Kraguljac Law Group, LLC

(57) ABSTRACT

Systems, methods, and other embodiments associated providing support for an application are described. In one embodiment, a method includes monitoring user interaction with a user interface to detect an occurrence of a condition indicative of a user requiring assistance with a user interface element. The example method may also include accessing executable code of the user interface to extract parameters of the user interface element. The example method may also include evaluating the user interaction and extracted parameters to identify entity objects that are used to query a documentation dictionary to identify documentation topics. The documentation topics are ranked based upon a strength of a correspondence between content within the documentation topics and the entity objects. The example method may also include rendering a documentation topic based upon a rank of the documentation topic.

19 Claims, 10 Drawing Sheets

(51) Int. Cl.
    *G06F 40/242*     (2020.01)
    *G06F 40/284*     (2020.01)

(56) References Cited

U.S. PATENT DOCUMENTS

| | | | | |
|---|---|---|---|---|
| 2003/0210260 | A1* | 11/2003 | Palmer | G06F 3/04895 |
| | | | | 715/715 |
| 2007/0192085 | A1* | 8/2007 | Roulland | G06F 16/3329 |
| | | | | 704/9 |
| 2013/0117668 | A1* | 5/2013 | Joseph | G06Q 30/0278 |
| | | | | 715/708 |
| 2014/0115459 | A1* | 4/2014 | Norwood | G06F 3/0484 |
| | | | | 715/708 |
| 2016/0283846 | A1* | 9/2016 | Keohane | G06F 9/453 |
| 2017/0228372 | A1* | 8/2017 | Moreno | G06F 16/24522 |
| 2017/0336933 | A1* | 11/2017 | Hassel | G06F 3/0484 |
| 2019/0139004 | A1* | 5/2019 | Vukovic | G06N 20/00 |

* cited by examiner

SMART CONTEXT AWARE SUPPORT ENGINE FOR APPLICATIONS

BACKGROUND

Many users may utilize an enterprise application to perform various tasks, such as to manage human resources data, manage projects of a business unit, manage financial data, etc. The enterprise application may be associated with documentation describing how the enterprise application operates. A user may access the documentation such as through an online manual or through a user interface of the enterprise application. The user must either browser page by page through the documentation or can submit a search query that will return portions of the documentation that match terms of the search query.

Unfortunately, the documentation can be vast and verbose, and thus is not very user friendly. The user could spend significant amounts of time and computer resources attempting to manually search the documentation for an answer to a specific question on how to operate the enterprise application. Furthermore, search results to a search query submitted by the user do not take into account a current context with which the user is interacting with the enterprise application. For example, the search results do not take into account a particular user interface or user interface element with which the user is attempting to interact. The inability to obtain adequate support for operating the enterprise application can affect operation of a computer and the enterprise application. For example, if the user misses or incorrectly performs a step while doing a setup of the enterprise application, then erroneous or unexpected results can occur during the execution of the enterprise application.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for a support module for an application, such as an enterprise application. In one embodiment, the present system implements the support module as a support engine that is embedded into the enterprise application such that the support module is capable of accessing executable code of the enterprise application. In this way, the enterprise application can take into account user interaction with a user interface of the enterprise application, system and application data of the enterprise application, and documentation for the enterprise application as contextual data for providing the user with contextually relevant support for the enterprise application.

Thus, when the user requests help or the support module detects that the user requires assistance, the support module can utilize the contextual data to construct a resolution based upon content within the documentation. The support module provides the user with more precise and contextually aware resolutions to issues of the enterprise application. This can improve the operation of the enterprise application, such as where erroneous operation or unexpected results could occur during execution due to improper setup of the enterprise application because an administrator did not have precise and contextually relevant instructions and support for proper setup.

Figure 1:
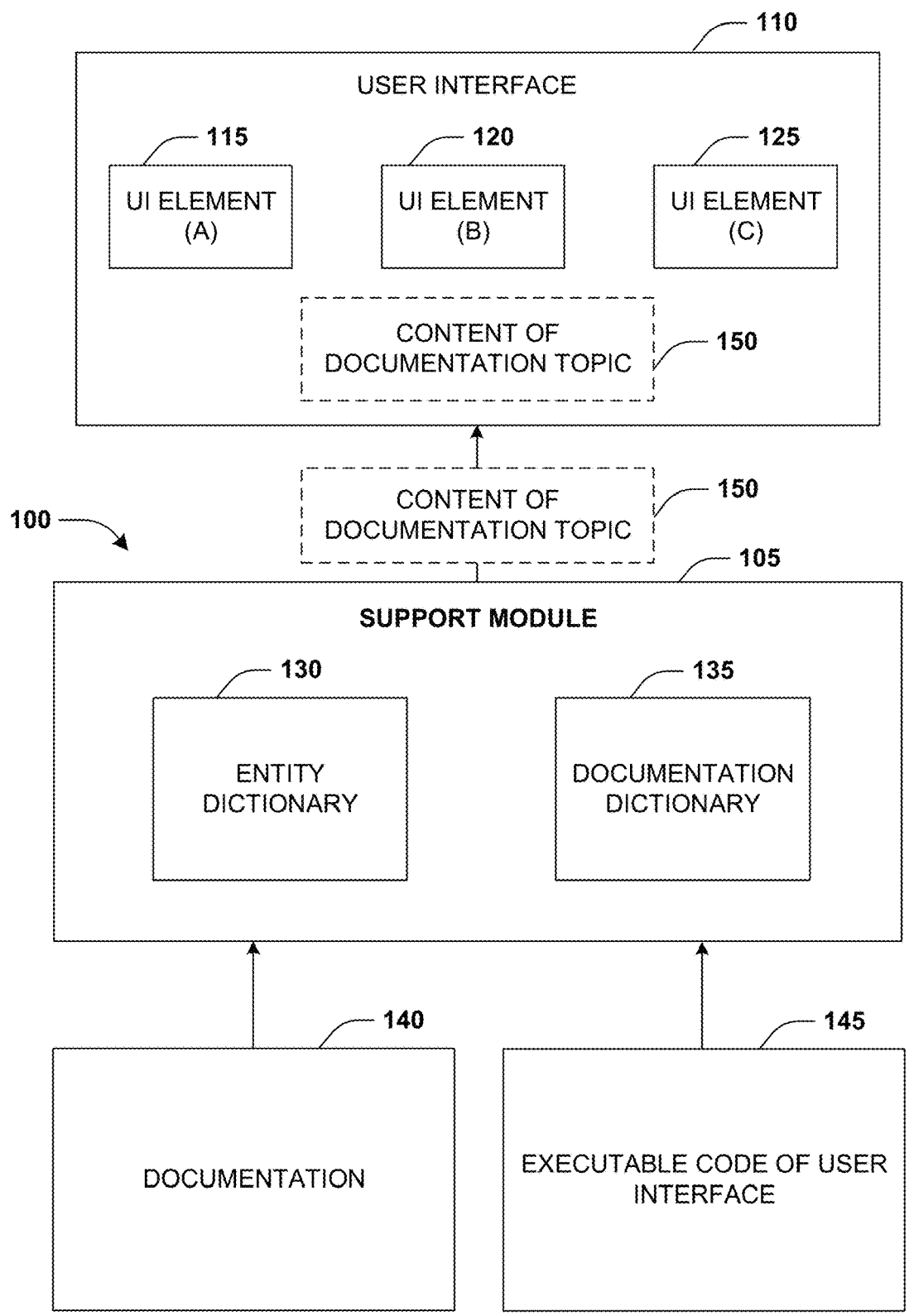
FIG. 1 illustrates an embodiment of a system associated with a support module for an application.

With reference to FIG. 1, one embodiment of a system 100 associated with providing support for an application such as an enterprise application is illustrated and summarized. A more detailed description is provided with reference to FIG. 2. The system 100 is implemented as a support module 105 hosted on a computing device, such as a computer 715 of FIG. 7. In one embodiment, the support module 105 is integrated into an enterprise application. The enterprise application hosts a user interface 110 that can be rendered on displays of computers, such as remote computers that access the enterprise application over a network. The support module 105 is configured to provide support for users of the enterprise application. For example, the support module 105 provides instructions and tutorials for how to interact with user interface elements of the user interface 110 to perform tasks, such as a user interface element (A) 115, a user interface element (B) 120, and a user interface element (C) 125. Such tasks can correspond to creating a computer network model, defining a workflow, inputting information into a user interface element, etc.

The support module 105 is configured to monitor user interaction with the user interface 110 to detect an occurrence of a condition indicative of a user requiring assistance with a user interface element of the user interface 110. In one embodiment, the condition corresponds to the user submitting a query for help, such as "how do I assign a project manager to the project I am creating". In another embodiment, the condition corresponds to the user attempting to input data into a user interface element a threshold number of times, such as the user unsuccessfully inputting a project manager's name into an input box. The condition may also be detected as an invalid entry, incorrect or incompatible entry being entered into an input field. Some input fields are programmed for specific types of input such as a number or range of number values. Receiving an input that is not a number or outside the range would be an invalid entry and/or incompatible.

The support module 105 utilizes the user interaction, an entity dictionary 130, a document dictionary 135, executable code 145 of the user interface 110, and documentation 140 for the enterprise application to determine how to provide the user with support. The entity dictionary 130 defines entity objects of the enterprise application, such as a project entity, a workflow entity, a user role entity, an accounting business unit entity, a computer entity, a router entity, a server entity, etc. In this way, the support module 105 can utilize the entity dictionary 130 to determine what entity objects are associated with what assistance the user requires. For example, the user may need assistance inputting a router configuration for a particular router entity.

The documentation dictionary 135 comprises a mapping between entity objects and documentation topics of the documentation 140. Thus, the support module 105 can utilize the documentation dictionary 135 to identify what documentation topics correspond to entity objects that are associated with what assistance the user requires. For example, certain documentation topics, such as a topic relating to how to configure new routers, may comprise content discussing a router entity object. The router entity object represent the concept of routers within an enterprise environment hosting the enterprise application. The executable code 145 can be analyzed to identify contextual information of the user interface 110 and the user interface elements, such as what input is expected to be received through an input box or what items are selectable through a drop down list. In this way, the support module 105 can utilize the user interaction, the entity dictionary 130, the document dictionary 135, and the executable code 145 to determine a context of what support the user requires.

The documentation 140 may comprise a vast amount of verbose content providing instructions on how the enterprise application operates, such as how to setup the enterprise application, how to create projects through the enterprise application, how to create workflows, etc. The documentation 140 may be organized into documentation topics, such as topics pertaining to installation, user login, assigning access rights to users, creating projects, managing projects, etc. Accordingly, the support module 105 utilizes contextual information of the user interaction and the executable code 145, along with the entity object information within the entity dictionary 130 and the mapping information within the documentation dictionary 135, to construct support information from content within the documentation 140.

In one embodiment of constructing the support information, the support module 105 detects that the user requires assistance with the user interface element (C) 125 for assigning a router configuration to a router. For example, the support module 105 detects user interaction of the user with the user interface element (C) 125. The user interaction may correspond to the user unsuccessfully attempting to input a router configuration into the user interface element (C) 125. The support module 105 accesses the executable code 145 to extract parameters of the user interface element (C) 125, such as an expected input data type and a verification command that is executed to verify whether input corresponds to valid/expected router configurations. The support module 105 evaluates the user interaction and the extract parameters using the entity dictionary 130 to extract one or more entity objects that match entity objects defined within the entity dictionary 130. In this way, the support module 105 identifies entity objects of the enterprise application that are contextually relevant to the user interaction with the user interface element (C) 125, such as a router entity object, a router configuration entity object, a network topology entity object, etc.

The support module 105 queries the documentation dictionary 135 using the one or more entity objects to identify document topics of the documentation 140 that are mapped to the entity objects. Each of the documentation topics are ranked based upon a strength of a correspondence between content within each documentation topic and the entity objects. Ranking the documentation topics determines which topics provide the best, most likely, or a possible solution/resolution to the detected condition of the user. The strength can be determined based at least upon a frequency of occurrence of an entity object within content of a documentation topic.

The strength of correspondence for the rank can also be determined based upon a frequency of occurrence of contextual information within content of the documentation topic, such as descriptions of actions that can be performed through the user interface element (C) 125 upon the entity object (e.g., assigning a configuration to a router). For example, an entity object corresponds to router configuration. The term router configuration may occur within content of 15 different documentation topics within the documentation 140. However, the term router configuration may occur more within content of certain documentation topics than content of other documentation topics. Those, the documentation topics with content having more occurrences of the term router configuration are ranked higher than the other documentation topics. Based upon the rank of each documentation topic, one or more documentation topics are selected (e.g., topic 150) as a solution to the detected condition where the user needed assistance. The user interface is then controlled to display the selected topic and solution based on the rank. The displayed topic provides instructions/content to assist the user for correctly interacting with the user interface elements or correctly entering values into input fields.

Figure 2:
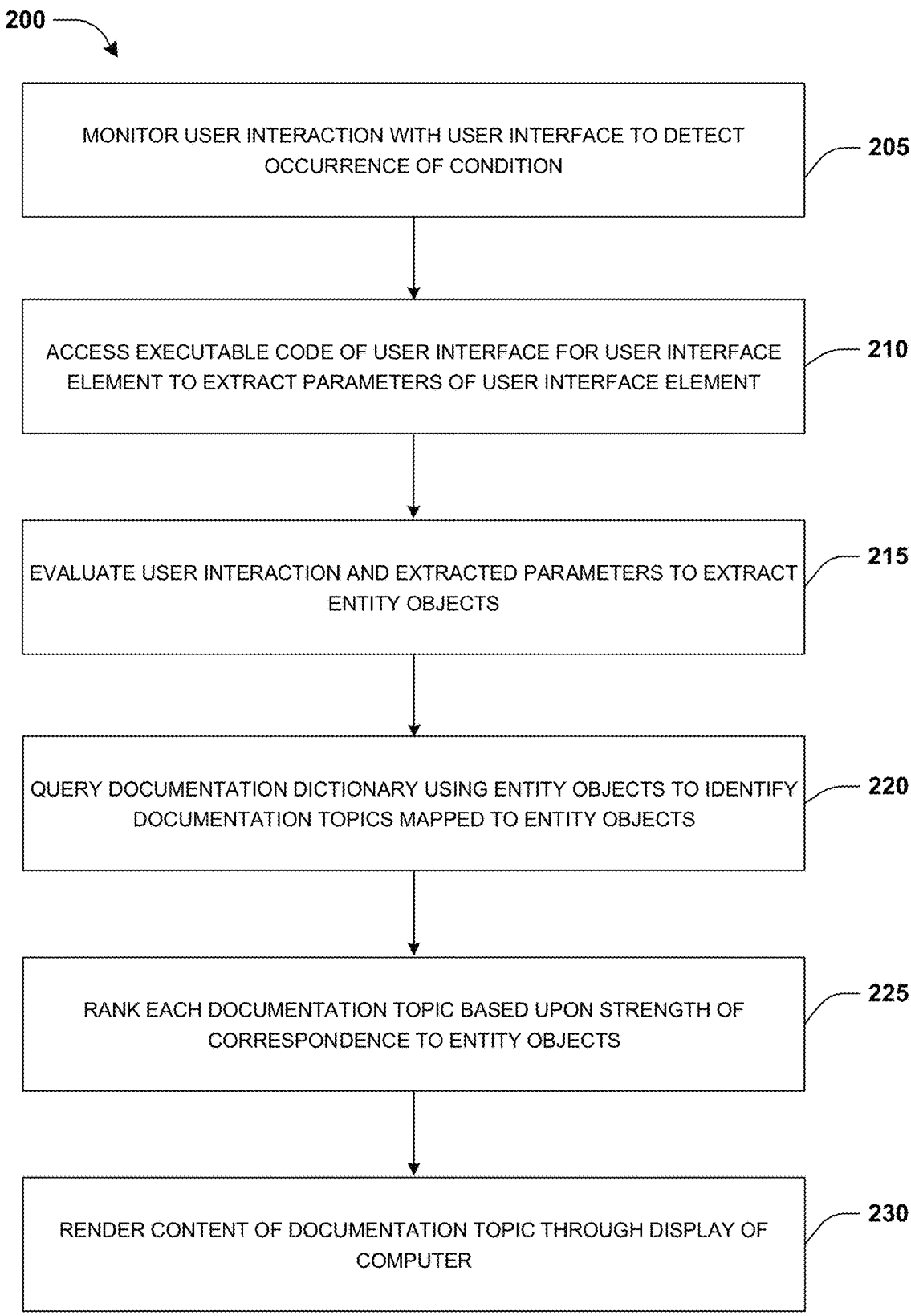
FIG. 2 illustrates an embodiment of a method associated with a support module for an application.

With reference to FIG. 2, one embodiment of a computer implemented method 200 associated with providing support for an application such as an enterprise application is illustrated. In one embodiment, the method 200 is performed by the support module 105 and system 300 of FIG. 3 utilizing various computing resources of the computer 715 of FIG. 7 or other computers. The computing resources, such as the processor 720, are used for executing instructions associated with monitoring user interaction, extracting entity objects, ranking documentation topics, and providing content of documentation topics. Memory 735 and/or disks 755 are used for storing an entity dictionary 335, a documentation dictionary 340, and/or other data. Network hardware is used accessing documentation of an enterprise application and/or for transmitting content of documentation topics from the computer 715 to remote computers over a network. The method 200 is triggered upon execution of the application.

During execution, the application renders a user interface, such as a computer topology design interface 310, through a display of a computer accessing the application. A user can interface with the computer topology design interface 310 to create a design of a computer topology of computer nodes connected over a network. Documentation 345 may be available for the application. The documentation 345 may be organized into documentation topics having content describing various topics of how the application operates, such as how to setup the application, how to operate the computer topology design interface 310, how to assign a network name to a node, etc. Because the documentation 345 can be vast and verbose such as with hundreds or thousands of pages describing technical details of many topics, the user may be unable to adequately locate content within the documentation 345 that would provide adequate support for a particular aspect of the application.

Figure 3:
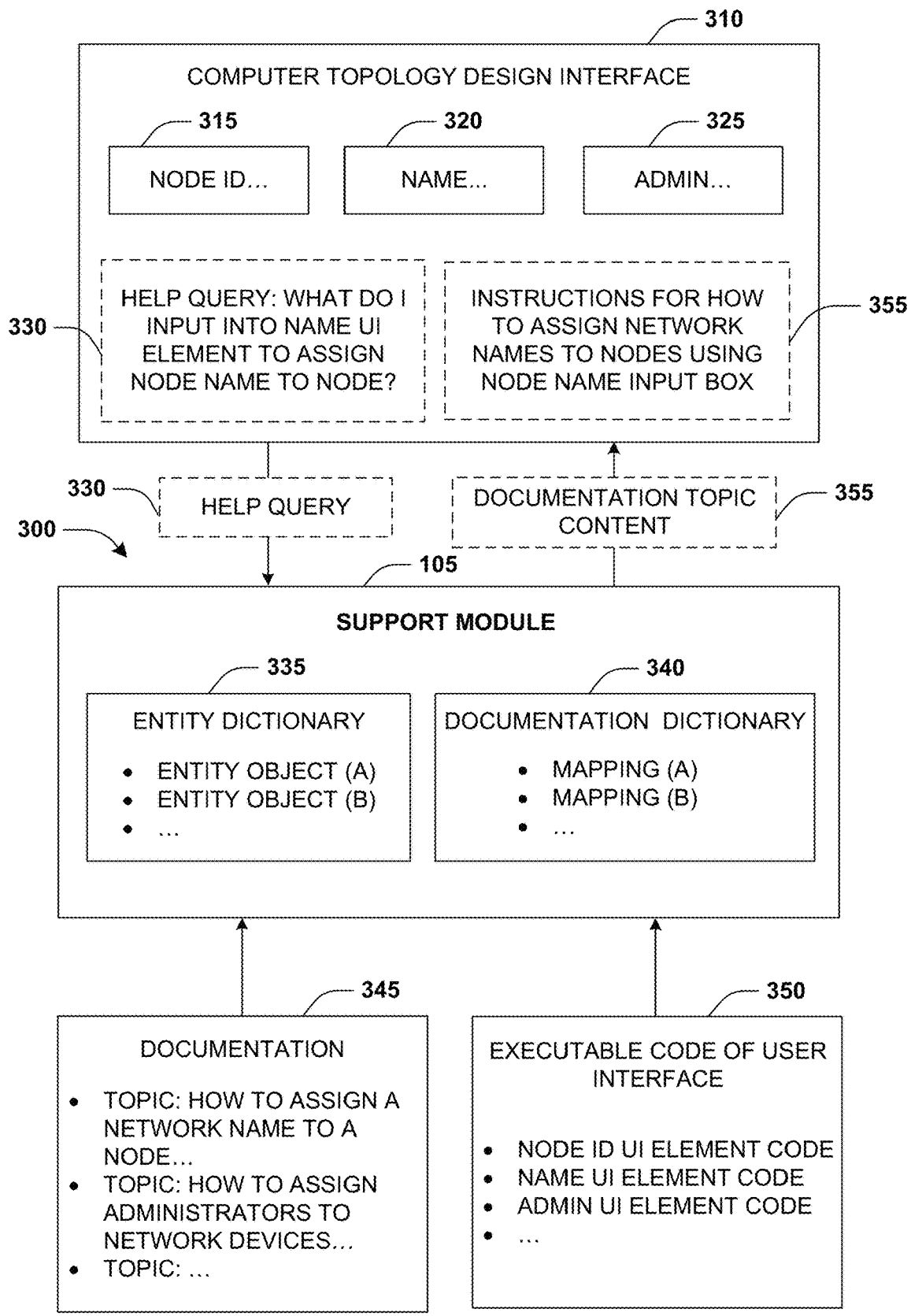
FIG. 3 illustrates an embodiment of a system associated with a support module for an application, where a documentation topic is provided in response to a query for help.

Accordingly, the support module 105 is configured to provide contextually aware and relevant support for the user based upon the documentation 345. At 205, the support module 105 monitors user interaction with the computer topology design interface 310 to detect an occurrence of a condition indicative of the user requiring assistance with a user interface element of the computer topology design interface 310. The computer topology design interface 310 comprises user interface elements such as a node ID input box 315, a node name input box 320, an administrator assignment input box 325, and/or other user interface elements. In one embodiment, the condition can correspond to the user actively requesting help, such as by the user submitting a query 330 for help "what do I input into the name UI element to assign node name to node?", as illustrated in FIG. 3. In another embodiment, the condition can correspond to the user performing a certain input(s), such as the user unsuccessfully attempting to enter a value into a user interface element a threshold number of times. For example, an input user interface element may be coded with a validation function. The validation function may reject input by the user that does not match or conform to an expected input.

In response to detecting the occurrence of the condition such as by receiving the query 330 submitted by the user for help with the node name input box 320, executable code 350 of the computer topology design interface 310 is accessed to extract parameters of the node name input box 320, at 210. That is, the support module 105 is integrated into the application so that the support module 105 has access to executable code of the application. The executable code 350 of the computer topology design interface 310 comprises executable programming code for the node ID input box 315, the node name input box 320, and the administrator assignment input box 325. The executable programming code can be analyzed by the support module 105 to extract parameters such as an expected input into a UI element (e.g., an administrator's name that matches administrator names within a list of current administrators) and/or an expected data type of the expected input (e.g., a number, a character string, a selection from an item in a list, etc.). The extracted parameters can correspond to text displayed for a UI element, such as a label of a button. The extracted parameters can correspond to data populated within a UI element, such as administrator names populated within a selection list. In this way, the support module 105 extracts the parameters for the node name input box 320 from the executable code 350.

At 215, the user interaction such as the query 330 and the extracted parameters are evaluated by the support module 105 using an entity dictionary 335 to extract one or more entity objects that match entity objects defined within the entity dictionary 335. That is, the entity dictionary 335 defines entity objects of the application, such as a project entity object, a computer topology design entity object, an administrator entity object, a computer node entity object, and/or business objects of the application. Accordingly, text strings from the query 330 and/or the extracted parameters can be matched to entity objects within the entity dictionary 335 to identify and extract one or more entity objects from the query 330 and the extracted parameters.

In one embodiment of extracting the one or more entity objects, the query 330 is processed using natural language processing to extract the entity objects. The natural language process is controlled to identify grammar tokens from the query 330, such as the identification of words within the query 330 as grammar tokens. Part of speech tagging is performed upon the grammar tokens to assign the grammar tokens to parts of speech, such as a noun, a pronoun, a verb, etc. Lemmatization is performed upon the grammar tokens based upon the parts of speech. Lemmatization groups together inflected forms of a word so that they can be analyzed as a single item to identify the word's lemma/ dictionary form. Upon completion of the lemmatization, pattern matching is performed upon the grammar tokens to extract potential entity objects. The potential entity objects are identified as the one or more extracted entity objects based upon occurrence of the potential entity objects within the entity dictionary 335. For example, "name UI element", "node name", "node", and/or other entity objects may be extracted because such potential entity objects occur within the entity dictionary 335.

In one embodiment, nouns in the query 330 that correspond to user values can be searched for in an application database to determine if the nouns map to relevant entities objects, and thus are searched for in the entity dictionary 335. For example, the user asks a question "How can I assign an administrator to Computer (A)", where the user really mean to ask "How can I assign a Name to Computer (A)". The support module 105 is capable of searching for Computer (A) in the application database to determine that it is a Node Name entity object and not an Admin entity object. Thus, the support module 105 can find a match in the entity dictionary 335 based upon the Node Name entity object.

In another embodiment of extracting the one or more entity objects, user input into the node name input box 320 may be used as contextual information. The user input can be used to check to see if the user input is invalid and if there are similar sounding valid values. For example, the user may input "Computer (A)" into the node name input box 320. The input "Computer (A)" may be extracted as contextual information that can be used to determine a context of the user interaction with the node name input box 320, such as whether "Computer (A)" is valid or invalid input. A field of the node name input box 320, such as a name field, is used to extract an entity object such as a node name entity object. The node name entity object is used to query the entity dictionary 335.

At 220, the support module 105 queries a mapping such as the documentation dictionary 340 using the one or more entities to identify one or more documentation topics mapped to the one or more entity objects within the documentation dictionary 340. The documentation dictionary 340 is populated with mappings between entity objects within the entity dictionary 335 and documentation topics of the documentation 345. For example, predefined documentation topics, a content section heading, an index, a table of content, or other content within the documentation 345 may be parsed to extract the documentation topics. Content of a documentation topic (e.g., a body of text underneath a content section heading) may be parsed to identify occurrences of entity objects within the entity dictionary 335 that occurred within the text of the content. In this way, mappings are created and populated within the documentation dictionary 340 based upon occurrences of entity objects from the entity dictionary 335 occurring within text of content of a documentation topic. In this way, the mappings within the documentation dictionary 340 can be used to identify documentation topics having content within which entity objects occur. The content of such documentation topics may comprise useful instructions for how a user can interact with a user interface element associated with corresponding entity objects.

At 225, each of the documentation topics matching the entity objects are ranked based upon a strength of a correspondence between content within each documentation topic to each of the entity objects. In one embodiment of ranking the documentation topics, a document parser such as a text parser is executed to parse the documentation 345 based upon the entity objects defined within the entity dictionary 335 to rank documentation topics. A documentation topic is ranked based upon a strength of a correspondence between content of the documentation topic (e.g., instructions, of how to assign network names to nodes, within a how to assign a network name to a node documentation topic) to an entity object. In one embodiment, the strength is determined based upon a frequency of occurrence of the entity object within text of the content of the documentation topic. The strength can also be determined based upon a frequency of occurrence of an action description of an action within the content. The action is a user action that the user can take upon the node name input box 320. Thus, the context of the computer topology design interface 310 is taken into account when determining how much content of a documentation correlates to an entity object. The user action may be identified based upon an evaluation of the executable code 350 for the node name input box 320. Ranking the documentation topics determines which topics provide the best, most likely, or a possible solution/resolution to the detected condition of the user.

In another embodiment of ranking the documentation topics, a list of documentation topics of ranked documentation topics are identified for each entity object. For example, for a first entity object of "node name", a first list of documentation topics having content within which the first entity object of "node name" occurs is created. Each documentation topic within the first list of documentation topics is ranked based upon a strength of a correspondence of content of each documentation topic to the first entity object of "node name". Similarly, other lists of documentation topics are created for other entity objects, such as a second list of documentation topics for a second entity object of "node", etc. A single combined list of documentation topics is created based upon the lists of documentation topics.

The combined list of documentation topics is created by combining (adding) ranks of each documentation topic within each list of documentation topics. Contextual information is also taken into account when ranking documentation topics, such as a field name of a user interface element, user input into the user interface element, and/or other information used to determine how relevant is content of a documentation topic to the user's question. Thus, the combined list of documentation topics will have ranks for each documentation topic that are derived from a summation of their ranks within the lists of documentation topics for each entity object. In this way, the combined ranks of the documentation topics can be used for selecting a documentation topic to provide to the user. Based upon the combined ranks of each documentation topic, one or more documentation topics are selected as a solution to the detected condition where the user needed assistance. The user interface is then controlled to display the selected topic and solution based on the rank. The displayed topic provides instructions/content to assist the user for correctly interacting with the user interface elements or correctly entering values into input fields.

At 230, content 355 of a documentation topic, selected based upon a rank of the documentation topic (e.g., a highest rank, a rank above a threshold, etc.), is rendered on a display of a computer displaying the computer topology design interface 310. The documentation topic is rendered on the display in order to provide the user with relevant and accurate content that can aid the user with solving their potential problem with interacting with the computer topology design interface 310. For example, the content 355 of the documentation topic may comprise instructions from the documentation 345 for how to assign network names to nodes using the node name input box 320. In one embodiment, the content 355 of the documentation topic is summarized to create a summary that is provided to the user. If the user interaction was detected as the query 330 asking a question, then the summary may be constructed as an answer to the question. If multiple documentation topics are selected based upon their rank (e.g., N number of highest ranked documentation topics), then the summary may be created based upon content within each of the documentation topics. In another embodiment, the content 355 of the documentation topic is evaluated to create instructions for performing an action with respect to the node name input box 320. The instructions are provided to the user. The content 355, summary, and/or instructions may be rendered through the computer topology design interface 310 or a separate interface such as a chat bot interface used to facilitate a help chat session for the user.

In one embodiment, a feedback interface is rendered. The feedback interface may comprise text soliciting the user's feedback for the computer topology design interface 310 and/or the node name input box 320. For example, the feedback interface may comprise an input box into which the user can type their thoughts about using the computer topology design interface 310. The user can input thoughts about the user's experience with creating a computer topology design and/or using the node name input box 320 to assign a node name to a node. In response to receiving feedback through the feedback interface, the feedback may be stored and/or transmitted over a network to a remote computing device, such as a computer of a developer of the enterprise application.

Figure 4:
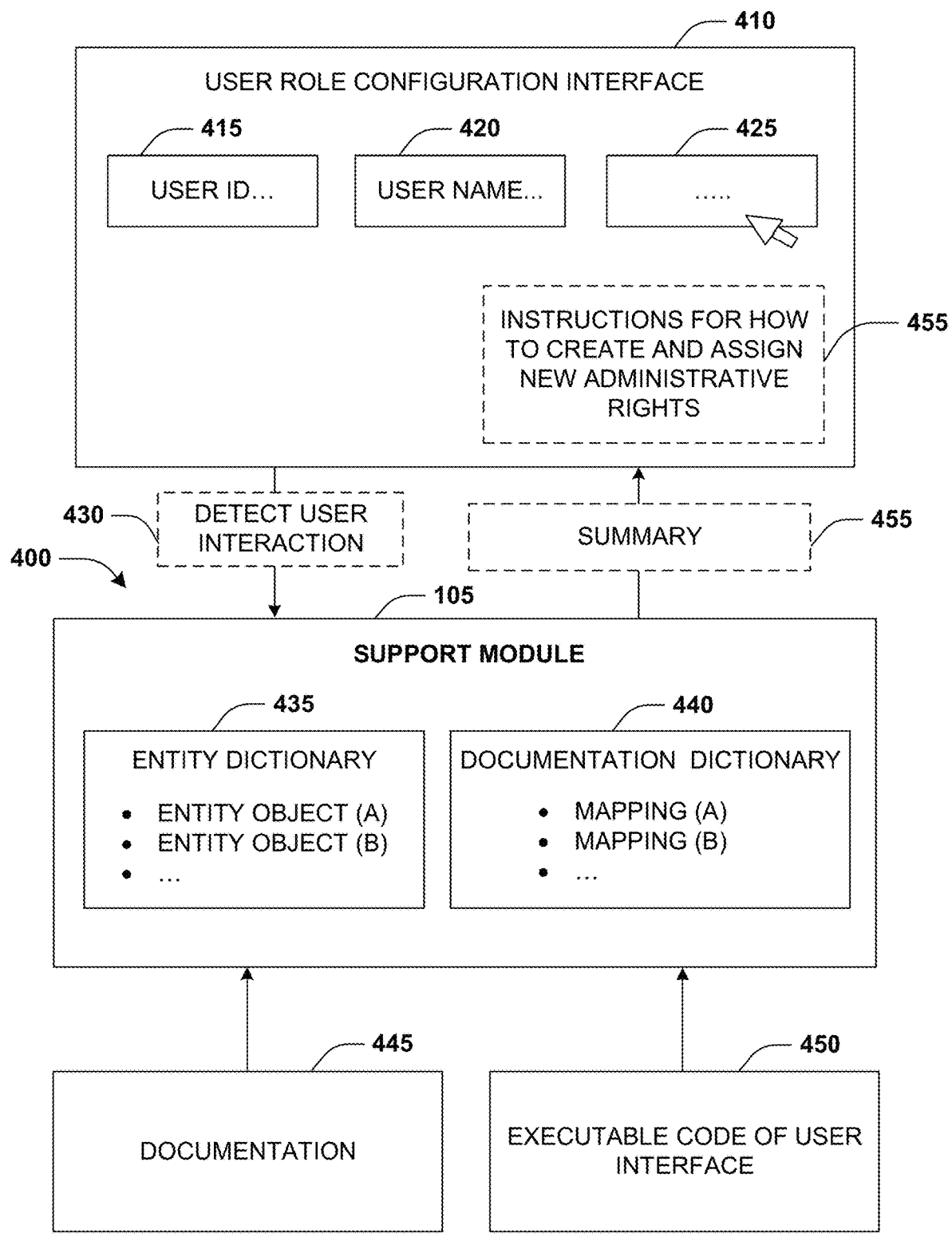
FIG. 4 illustrates an embodiment of a system associated with a support module for an application, where a documentation topic is provided in response to determining that a user requires assistance.

FIG. 4 illustrates a system 400 for providing support for an application such as an enterprise application. The application may comprise a user role configuration interface 410 through which a user can configure user roles for users of a computing environment. The user role configuration interface 410 comprises a user ID input box 415, a user name input box 420, an administrative rights input box 425, and/or other user interface elements. The support module 105 is configured to monitor user interaction with the user role configuration interface 410. In one embodiment, the support module 105 detects 430 an occurrence of a condition indicative of the user requiring assistance with one of the user interface elements or input fields. For example, the user may be inputting incorrect values in the administrative rights input box 425. The condition may be detected based upon the user unsuccessfully attempting to fill in the administrative rights input box 425 a threshold number of times. For example, the user may input administrator rights that do not exist and/or are invalid entries. Thus, executable code that controls the administrative rights input box 425 rejects the input as not matching any existing administrator rights. In another example where user input is rejected, the user may input a name of an employee that is a contractor and not a full-time employee. The application may ensure that only employees are provided with administrator rights, and not contractors. Thus, the input is rejected by the application. In this case, the support module 105 can inform the user of this rule.

The support module 105 gathers contextual information that can be used to provide support to the user for the administrative rights input box 425. The support module 105 accesses the executable code 450 of the user role configuration interface 410 for the administrative rights input box 425 to extract parameters of the administrative rights input box 425. The parameters may comprise a list of existing administrative rights that are expected input, which are extracted as the contextual information and/or one or more entity objects. Also, the support module 105 may evaluate the user interaction, such as what input the user attempted to input into the administrative rights input box 425, to identify the contextual information. The support module 105 also evaluates the extracted parameters and the contextual information using an entity dictionary 435 to extract one or more entity objects that match entity objects defined within the entity dictionary 435. The one or more entity objects may correspond to "administrative rights", "user role", a label/title of the administrative rights input box 425, etc. The one or more entity may also correspond to the administrative rights within the list of existing administrative rights, and/or other text that matches entity objects and/or their descriptions defined within the entity dictionary 435.

The support module 105 queries a documentation dictionary 440 using the one or more entity objects. The support module 105 performs the query to identify one or more documentation topics of documentation 445 that are mapped to the one or more entity objects by the documentation dictionary 440. The one or more documentation topics are identified as being mapped by the documentation dictionary 440 to the one or more entity objects. For example, a how to assign administrative rights topic, a how to delete administrator topic, a how to add a new administrator topic, and a how to define new administrative rights topic may be identified.

The support module 105 ranks the documentation topics based upon a strength of a correspondence between content within each documentation topic and each entity object. The support module 105 may select the how to define new administrative rights topic and the how to assign administrative rights topic as having ranks above a threshold. Accordingly, the support module 105 creates a summary 455 of instructions for how to create and assign new administrative rights. The summary 455 may be created based upon text, images, videos, audio, and/or other content of the how to define new administrative rights topic and the how to assign administrative rights topic. The support module 105 renders the summary 455 through the user role configuration interface 410 or other interface.

Figure 5A:
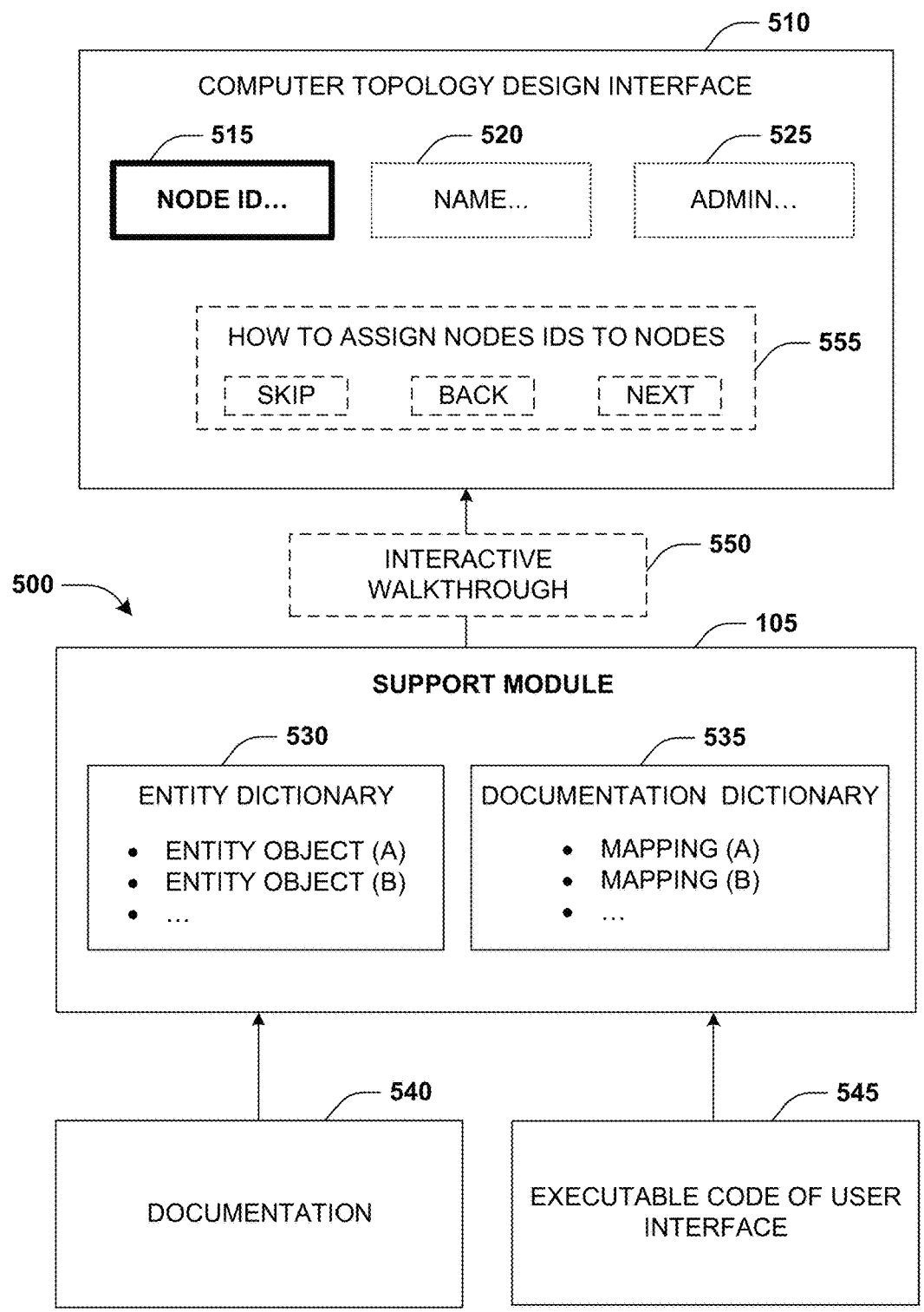
FIG. 5A illustrates an embodiment of a system associated with a support module for an application, where an interactive walkthrough has started.
Figure 5B:
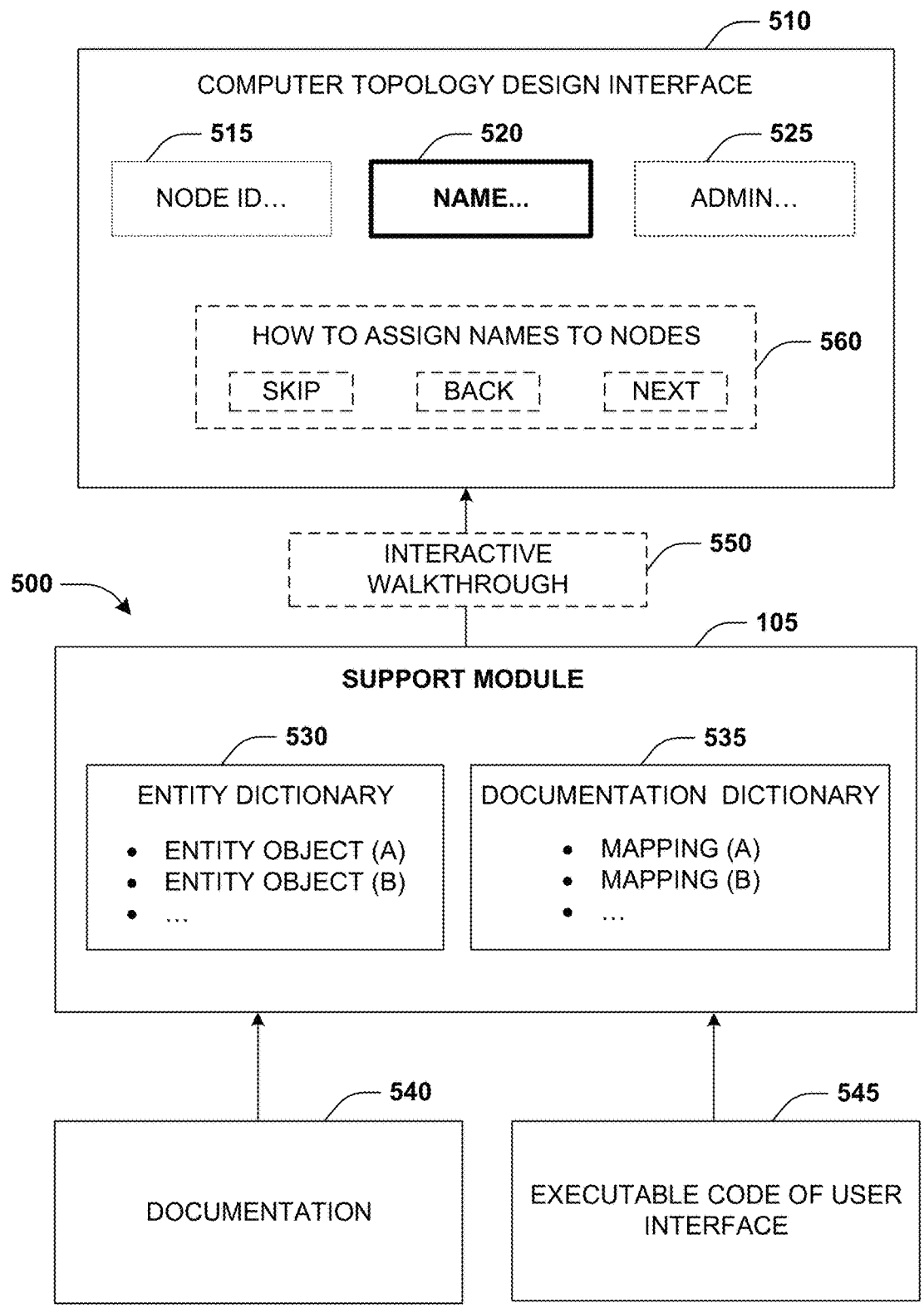
FIG. 5B illustrates an embodiment of a system associated with a support module for an application, where an interactive walkthrough has progressed to a next step.

FIGS. 5A and 5B illustrate a system 500 for providing support for an application such as an enterprise application. The enterprise application may comprise a computer topology design interface 510 comprising a node ID input box 515, a node name input box 520, an admin assignment input box 525, and/or other user interface elements. A support module 105 may be configured to construct an interactive walkthrough 550 for how to use the computer topology design interface 510. The support module 105 accesses executable code 545 of the enterprise application to extract parameters of user interface elements of the computer topology design interface 510, such as labels, expected inputs, functions, scripts, database calls, etc. The support module 105 extracts entity objects from the parameters based upon text of the parameters matching entity objects defined within an entity dictionary 530 for the enterprise application.

The support module 105 dynamically constructs instructions and steps to be demonstrated by the interactive walkthrough 550. In one example, the support module 105 dynamically generates certain instructions based upon a context of the enterprise application. The context can correspond to user interface elements of the computer topology design interface 510 and functions and fields of those user interface elements. For example, the support module 105 may construct instructions for how to use those user interface elements of the computer topology design interface 510, but not other user interface elements of the enterprise application. The context can also correspond to current or prior user interaction with particular user interface elements, such as the user attempting to use certain user interface elements to configure a router. Thus, the support module 105 would dynamically construct instructions relating to how those user interface elements can be correctly used to configure the router. Instructions can be dynamically constructed using selective content from documentation topics of documentation for the enterprise application. In one embodiment, the instructions and the interactive walkthrough 550 do not exist prior to the user interacting with the enterprise application, and thus are created on the fly during execution of the enterprise application based upon a current context of the user interacting with the enterprise application.

The support module 105 queries a documentation dictionary 535 mapping entity objects to documentation topics within documentation 540 for the enterprise application. The support module 105 performs the query to identify documentation topics matching the entity objects extracted from the parameters of the user interface elements of the computer topology design interface 510. The support module 105 constructs a set of instructions about how to use the computer topology design interface 510 based upon content of the documentation topics. The set of instructions are used to create a set of commands that are executed as the interactive walkthrough 550 to walk the user through interacting with the computer topology design interface 510. In this way, the set of instructions are dynamically constructed (e.g., selective content from the documentation topics may be summarized and used to create instructions) based upon the context of the enterprise application.

During execution of the interactive walkthrough 550 a first interface 555 is populated with a first instruction for how to assign node IDs to nodes through the node ID input box 515. In one embodiment, the support module 105 interacts with the executable code 545 to modify the display of the node ID input box 515. For example, the support module 105 performs a modification command to bold text within the node ID input box 515 and thicken a line of the node ID input box 515. The support module 105 may also modify the display of other user interface elements that do not pertain to the first instruction, such as to grey out the node name input box 520 and the admin assignment input box 525.

The first interface 555 is populated with a skip button, a back button, and a next button. The skip button can be used to skip a current instruction. The back button can be used to transition to a prior instruction. The next button can be used to transition to a next instruction. In one embodiment, in response to the next button being invoked, the first interface 555 is removed and a second interface 560 is rendered, as illustrated by FIG. 5B. The second interface 560 is populated with a second instruction for how to assign names to nodes through the node name input box 520. The support module 105 interacts with the executable code 545 to modify the display of the node name input box 520, such as to bold text within the node name input box 520 and thicken a line of node name input box 520. The support module 105 may also modify the display of other user interface elements that do not pertain to the first instruction, such as to grey out the node ID input box 515 and the admin assignment input box 525. In this way, content of the documentation 540 and a context of the enterprise application such as parameters of currently displayed user interface elements are used to provide the interactive walkthrough 550.

Figure 6:
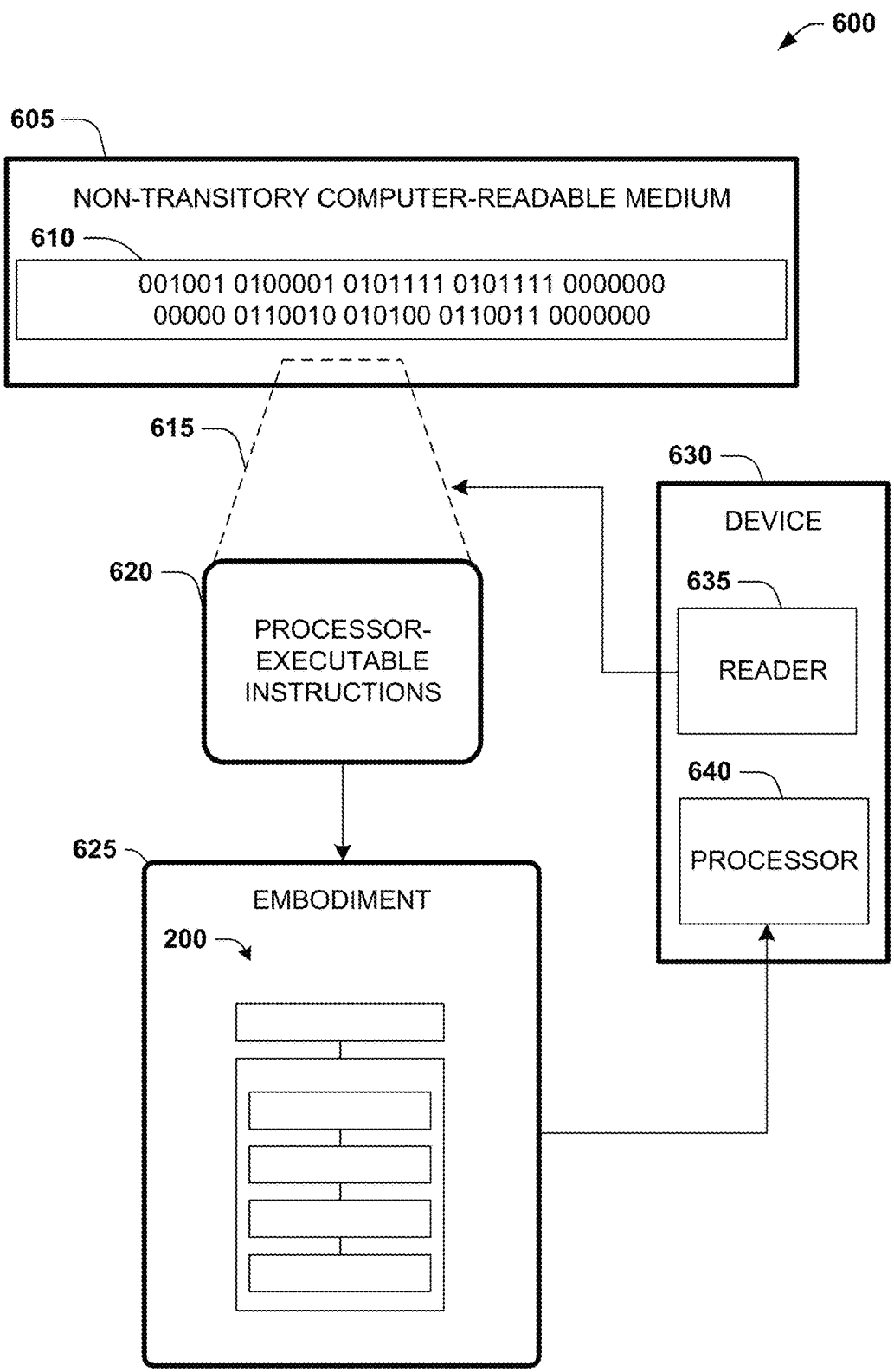
FIG. 6 illustrates an embodiment of a non-transitory computer-readable medium.

FIG. 6 is an illustration of a scenario 600 involving an example non-transitory computer-readable medium 605. In one embodiment, one or more of the components described herein are configured as program modules, such as the support module 105, stored in the non-transitory computer-readable medium 605. The program modules are configured with stored instructions, such as processor-executable instructions 620, that when executed by at least a processor, such as processor 640, cause the computing device to perform the corresponding function(s) as described herein. In one embodiment, the, functionality of the support module 105, stored in the non-transitory computer-readable medium 605, may be executed by the processor 640 as the processor-executable instructions 620 to perform an embodiment 625 of the method 200 of FIG. 2.

The non-transitory computer-readable medium 605 includes the processor-executable instructions 620 that when executed by a processor 640 cause performance of at least some of the provisions herein. The non-transitory computer-readable medium 605 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 605 stores computer-readable data 610 that, when subjected to reading 615 by a reader 635 of a device 630 (e.g., a read head of a hard disk drive, or a read operation invoked on a solid-state storage device), express the processor-executable instructions 620.

In some embodiments, the processor-executable instructions 620, when executed cause performance of operations, such as at least some of the example method 200 of FIG. 2, for example. In some embodiments, the processor-executable instructions 620 are configured to cause implementation of a system, such as at least some of the example system 100 of FIG. 1, for example.

Figure 7:
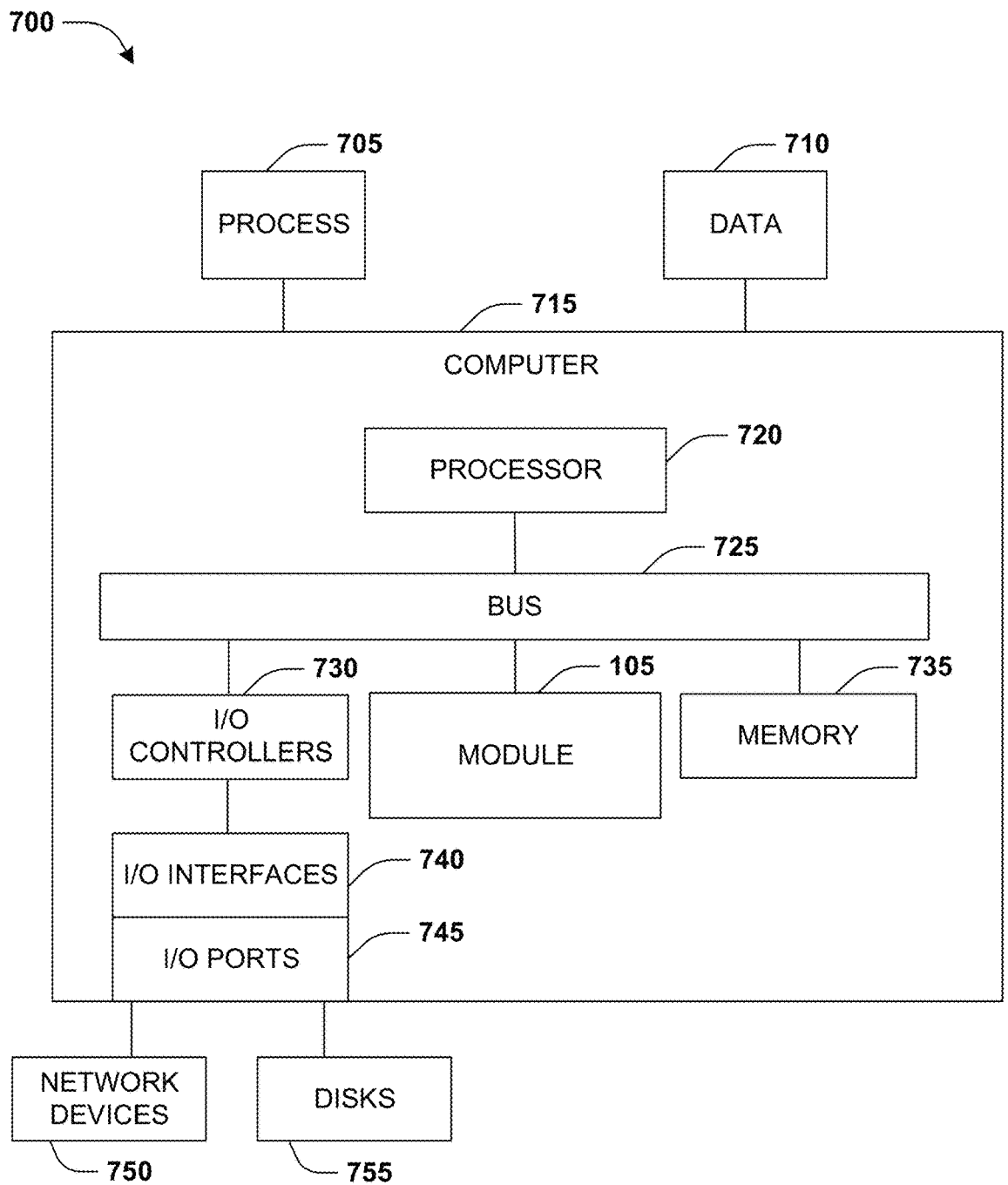
FIG. 7 illustrates an embodiment of a computing system configured with the example systems and/or methods disclosed.

FIG. 7 illustrates an example computing device 700 that is configured and/or programmed with one or more of the example systems and methods described herein, and/or equivalents. The example computing device 700 may be the computer 715 that includes a processor 720, a memory 735, and I/O ports 745 operably connected by a bus 725. In one embodiment, the computer 715 may include logic of the support module 105 configured to facilitate the system 100 and/or the method 200 shown in FIGS. 1-2. In different embodiments, the logic of the support module 105 may be implemented in hardware, a non-transitory computer-readable medium 705 with stored instructions, firmware, and/or combinations thereof. While the logic of the support module 105 is illustrated as a hardware component attached to the bus 725, it is to be appreciated that in other embodiments, the logic of the support module 105 could be implemented in the processor 720, stored in memory 735, or stored in disk 755.

In one embodiment, logic of the support module 105 or the computer 715 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 715 as data 710 that are temporarily stored in memory 735 and then executed by processor 720.

The logic of the support module 105 may also provide means (e.g., hardware, non-transitory computer-readable medium 705 that stores executable instructions, firmware) for performing rule based source sequencing for allocation.

Generally describing an example configuration of the computer 715, the processor 720 may be a variety of various processors including dual microprocessor and other multi-processor architectures. The memory 735 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 755 may be operably connected to the computer 715 via, for example, the I/O interface 740 (e.g., card, device) and the I/O ports 745. The disks 755 may be, for example, a magnetic disk drive, a solid state disk drive, a floppy disk drive, a tape drive, a Zip drive, a flash memory card, a memory stick, and so on. Furthermore, the disks 755 may be a CD-ROM drive, a CD-R drive, a CD-RW drive, a DVD ROM, and so on. The memory 735 can store a process, such as within the non-transitory computer-readable medium 705, and/or data 710, for example. The disk 755 and/or the memory 735 can store an operating system that controls and allocates resources of the computer 715.

The computer 715 may interact with input/output (I/O) devices via the I/O interfaces 740 and the I/O ports 745. The I/O devices may be, for example, a keyboard, a microphone, a pointing and selection device, cameras, video cards, displays, the disks 755, the network devices 750, and so on. The I/O ports 745 may include, for example, serial ports, parallel ports, and USB ports. I/O controllers 730 may connect the I/O interfaces 740 to the bus 725.

The computer 715 can operate in a network environment and thus may be connected to the network devices 750 via the I/O interfaces 740, and/or the I/O ports 745. Through the network devices 750, the computer 715 may interact with a network. Through the network, the computer 715 may be logically connected to remote computers (e.g., the computer 715 may reside within a distributed computing environment to which clients may connect). Networks with which the computer 715 may interact include, but are not limited to, a local area network (LAN), a new area network (WAN), and other networks.

Figure 8:
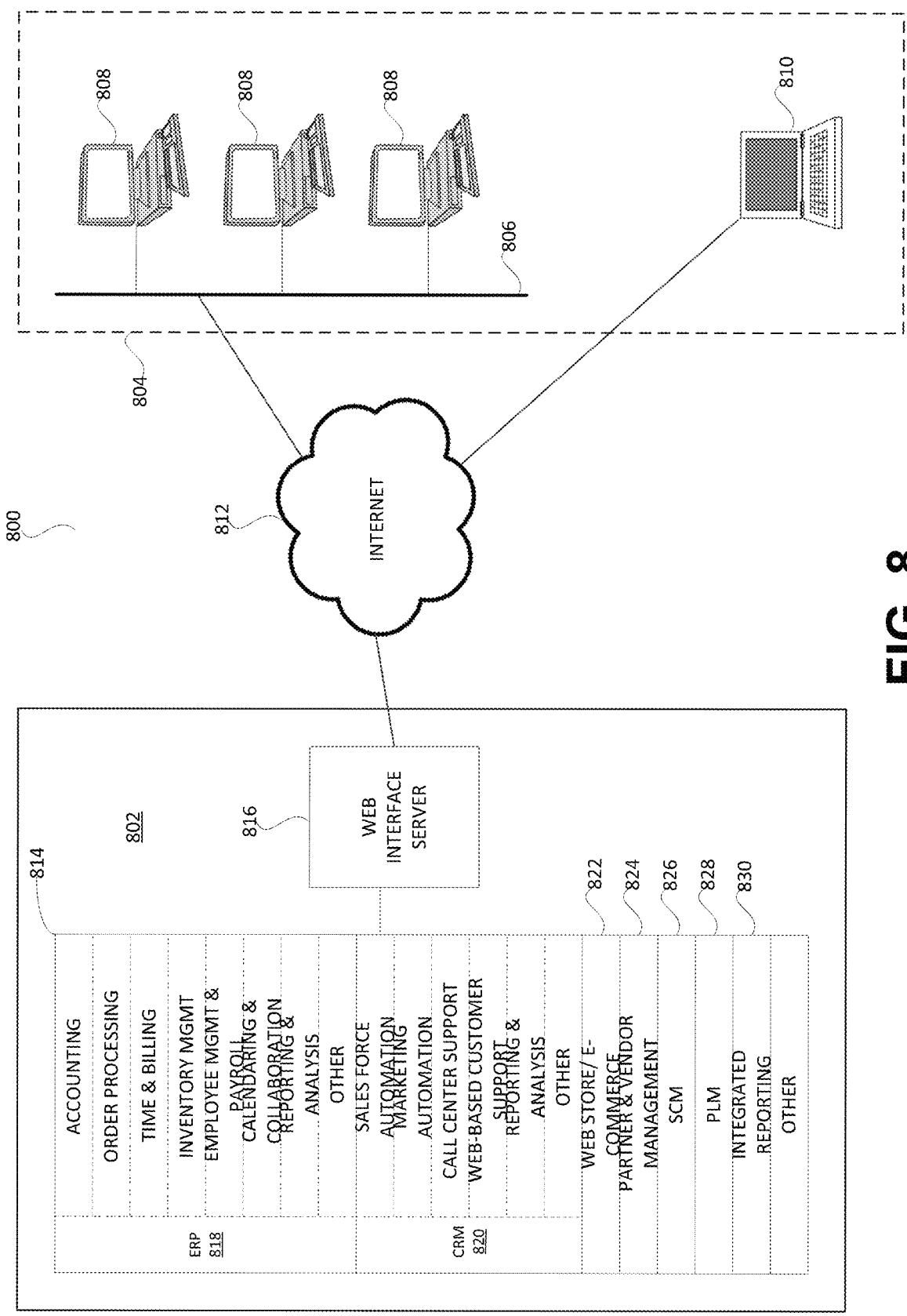
FIG. 8 illustrates an embodiment of an integrated business system and an enterprise network in which an embodiment of the invention may be implemented.

FIG. 8 is a diagram illustrating a system 800 in which an embodiment of the invention may be implemented. Enterprise network 804 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 804 is represented by an on-site local area network 806 to which a plurality of personal computers 808 are connected, each generally dedicated to a particular end user, such as a service agent or other employee (although such dedication is not required), along with an exemplary remote user computer 810 that can be, for example, a laptop computer or tablet computer of a traveling employee having internet access through a public Wi-Fi access point, or other internet access method. The end users (consumers) associated with computers 808 and 810 may possess an internet-enabled smartphone or other electronic device (such as a PDA, tablet, laptop computer) having wireless internet access or other synchronization capabilities. Users of the enterprise network 804 interface with the integrated business system 802 across the Internet 812 or another suitable communications network or combination of networks.

Integrated business system 802, which may be hosted by a dedicated third party, may include an integrated business server 814 and a web interface server 816, coupled as shown in FIG. 8. It is to be appreciated that either or both of the integrated business server 814 and the web interface server 816 may be implemented on one or more different hardware systems and components, even though represented as singular units in FIG. 8.

In a typical example in which system 802 is operated by a third party for the benefit of multiple account owners/tenants, each of whom is operating a business, integrated business server 814 comprises an ERP module 818 and further comprises a CRM module 820. In many cases, it will be desirable for the ERP module 818 to share methods, libraries, databases, subroutines, variables, etc., with CRM module 820, and indeed ERP module 818 may be intertwined with CRM module 820 into an integrated Business Data Processing Platform (which may be single tenant, but is typically multi-tenant).

The ERP module 818 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 820 may include, but is not limited to, a sales force automation (SFA) module, a marketing automation module, a contact list module (not shown), a call center support module, a web-based customer support module, a reporting and communication module, and other CRM-related modules.

The integrated business server 814 (or multi-tenant data processing platform) further may provide other business functionalities including a web store/eCommerce module 822, a partner and vendor management module 824, and an integrated reporting module 830. An SCM (supply chain management) module 826 and PLM (product lifecycle management) module 828 may also be provided. Web interface server 816 is configured and adapted to interface with the integrated business server 814 to provide one or more web-based user interfaces to end users of the enterprise network 804.

The integrated business system shown in FIG. 8 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 9:
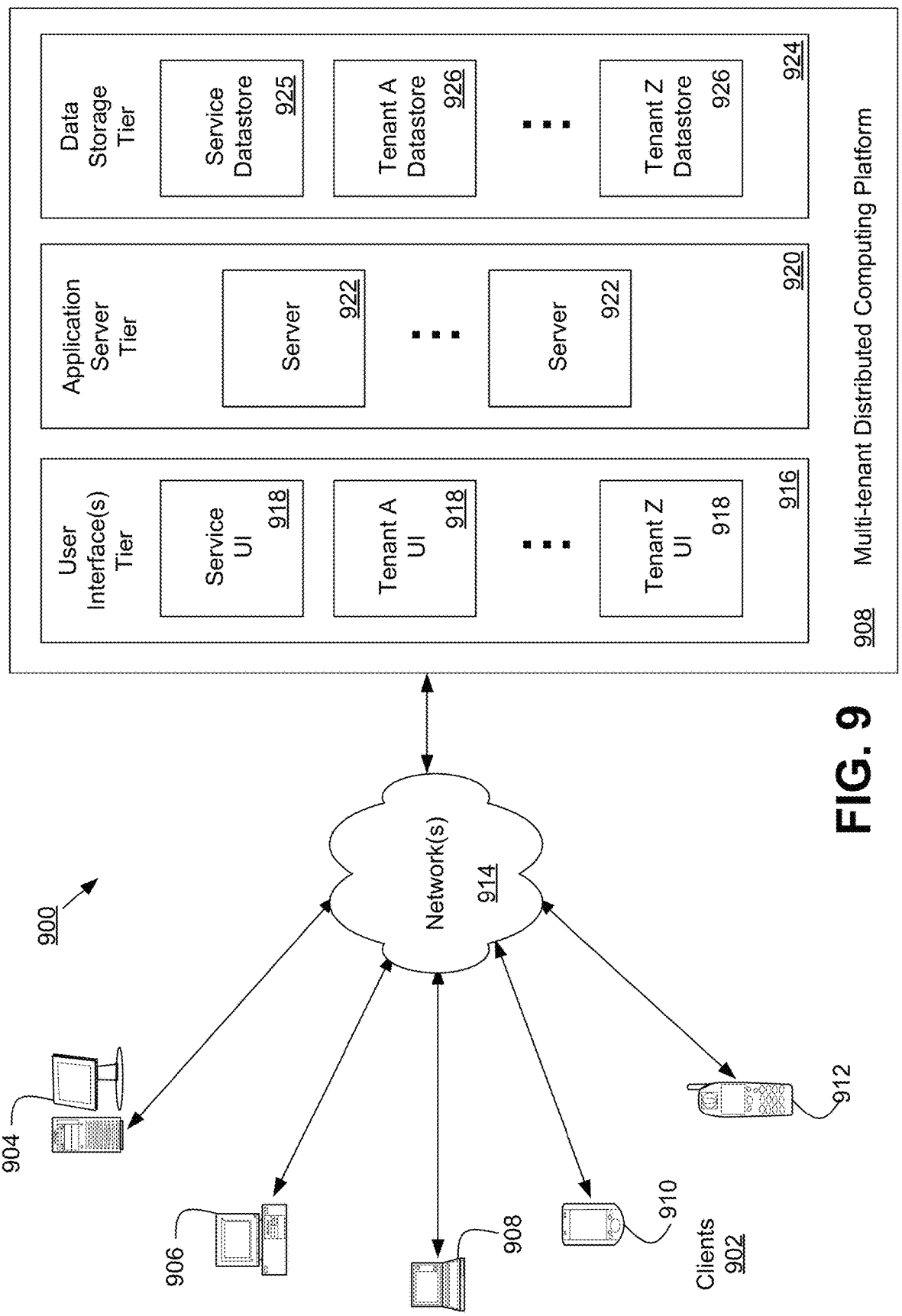
FIG. 9 illustrates an embodiment of a multi-tenant distributed computing service platform.

FIG. 9 is a diagram illustrating elements or components of an example operating environment 900 in which an embodiment of the invention may be implemented. As shown, a variety of clients 902 incorporating and/or incorporated into a variety of computing devices may communicate with a distributed computing service/platform 908 through one or more networks 914. For example, a client may incorporate and/or be incorporated into a client application (e.g., software) implemented at least in part by one or more of the computing devices.

Examples of suitable computing devices include personal computers, server computers 904, desktop computers 906, laptop computers 908, notebook computers, tablet computers or personal digital assistants (PDAs) 910, smart phones 912, cell phones, and consumer electronic devices incorporating one or more computing device components, such as one or more electronic processors, microprocessors, central processing units (CPU), or controllers. Examples of suitable networks 914 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 908 may include multiple processing tiers, including a user interface tier 916, an application server tier 920, and a data storage tier 924. The user interface tier 916 may maintain multiple user interfaces 918, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 924 may include one or more data stores, which may include a Service Data store 925 and one or more Tenant Data stores 926.

Each tenant data store 926 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 908 may be multi-tenant and service platform 908 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 922 that are part of the platform's Application Server Tier 920.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 908 of FIG. 9(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 922 that are part of the platform's Application Server Tier 920.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 908 of FIG. 9).

As noted with regards to FIG. 7, the integrated business system shown in FIG. 9 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:
    monitor user interaction with a user interface to detect an occurrence of a condition indicative of the user interaction requiring assistance with a user interface element of the user interface, wherein the condition includes detecting an invalid input into the user interface element;
    access executable code of the user interface for the user interface element to extract parameters from the executable code of the user interface element, wherein the extracted parameters from the executable code define expected values or valid input values for the user interface element;
    evaluate the user interaction and the extracted parameters from the executable code to identify one or more first entity objects;
    in response to receiving a query submitted by the user, execute a natural language process upon the query to extract one or more second entity objects by controlling the natural language process to:
    identify grammar tokens from the query;
    perform part of speech tagging upon the grammar tokens to assign the grammar tokens to parts of speech; and
    perform lemmatization upon the grammar tokens based upon the parts of speech to create the one or more second entity objects;
    query a documentation database using a combination of the one or more first entity objects and the one or more second entity objects to identify one or more documentation topics that are mapped to the one or more first entity objects and the one or more second entity objects;
    rank each of the one or more documentation topics to determine which document topics provide a solution to the condition, wherein each rank is based at least in part upon a strength of a correspondence between content within each documentation topic to the combination of the one or more first entity objects and the one or more second entity objects; and
    control the user interface to render content of a documentation topic that is selected based upon the ranks of the documentation topics to provide a solution to assist the user interaction;
    wherein the solution includes instructions to assist the user to correctly interact with the user interface element and input valid values into the user interface element.

2. The non-transitory computer-readable medium of claim 1, wherein the instructions to evaluate the user interaction and the extracted parameters further comprise instructions to:
    parse the query to extract the grammar tokens from the query; and
    perform pattern matching upon the grammar tokens to extract the one or more second entity objects.

3. The non-transitory computer-readable medium of claim 1, wherein the instructions to monitor user interaction comprise instructions to:

determine that the condition occurred based upon a determination that the user performed a threshold number of attempts at entering a value into the user interface element.

4. The non-transitory computer-readable medium of claim 3, wherein the instructions to evaluate the user interaction and the extracted parameters comprise instructions to:
evaluate user input into the user interface element to extract an entity object from the user input.

5. The non-transitory computer-readable medium of claim 1, wherein the instructions to render a documentation topic comprise instructions to:
construct a summary of the content of the documentation topic; and
populate a chat bot interface with the summary.

6. The non-transitory computer-readable medium of claim 1, wherein the user interaction comprises a question submitted by the user, and wherein the instructions to render a documentation topic comprise instructions to:
summarize content of the documentation topic within the documentation to construct an answer to the question; and
rendering the answer on the display.

7. The non-transitory computer-readable medium of claim 1, wherein the instructions to rank each of the one or more documentation topics comprise instructions to:
execute a document parser to parse the documentation based upon entity objects defined within an entity dictionary to rank documentation topics, wherein a strength of a correspondence between content of the documentation topic within the documentation and an entity object is determined based upon a frequency of occurrence of the entity object within the content and a frequency of occurrence of an action description of an action within the content, wherein the action corresponds to a user action that the user can take upon the user interface element.

8. A computing system, comprising:
a processor connected to memory; and
a support module stored on a non-transitory computer readable medium and configured with instructions that when executed by the processor cause the processor to:
monitor user interaction with a user interface to detect an occurrence of a condition indicative of the user interaction requiring assistance with a user interface element of the user interface, wherein the condition includes detecting an invalid input into the user interface element;
access executable code of the user interface for the user interface element to extract parameters from the executable code of the user interface element, wherein the extracted parameters from the executable code define expected values or valid input values for the user interface element;
evaluate the user interaction and the extracted parameters from the executable code to identify one or more first entity objects;
in response to receiving a query submitted by the user, execute a natural language process upon the query to extract one or more second entity objects by controlling the natural language process to:
identify grammar tokens from the query;
perform part of speech tagging upon the grammar tokens to assign the grammar tokens to parts of speech; and
perform lemmatization upon the grammar tokens based upon the parts of speech to create the one or more second entity objects;
query a documentation database using a combination of the one or more first entity objects and the one or more second entity objects to identify one or more documentation topics that are mapped to the one or more first entity objects and the one or more second entity objects;
rank each of the one or more documentation topics to determine which document topics provide a solution to the condition, wherein each rank is based at least in part upon a strength of a correspondence between content within each documentation topic to the combination of the one or more first entity objects and the one or more second entity objects; and
control the user interface to render content of a documentation topic that is selected based upon the ranks of the documentation topics to provide a solution to assist the user interaction;
wherein the solution includes instructions to assist the user to correctly interact with the user interface element and identify the expected values or valid input values for the user interface element that were extracted from the executable code of the user interface.

9. The computing system of claim 8, wherein the support module is integrated into the user interface such that the support module has access to the executable code of the user interface, wherein the parameters correspond to at least one of the expected values, the valid input values for the user interface element, an expected data type of the valid input values, text displayed for the user interface element, a command used to process input received through the user interface element, or data populated within the user interface element.

10. The computing system of claim 9, wherein the instructions comprise instructions that cause the processor to:
modify the user interface by interacting with the executable code.

11. The computing system of claim 8, wherein the instructions to rank each of the one or more documentation topics comprise instructions that cause the processor to:
for each of the first entity objects and the second entity objects, identifying a list of documentation topics comprising documentation topics ranked based upon a strength of a correspondence between content within each documentation topic to the given entity object;
generate a combined list of documentation topics from the lists of documentation topics by combining ranks within each list of documentation topics for each documentation topic to create combined ranks for each documentation topic; and
utilize the combine ranks for selecting the documentation topic to provide to the user.

12. The computing system of claim 8, wherein the instructions comprise instructions that cause the processor to:
construct an interactive walkthrough comprising a set of commands that are executed to walk the user through interacting with the user interface based upon content within the documentation topic; and
execute the interactive walkthrough to control the user interface for walking the user through interacting with the user interface.

13. The computing system of claim 12, wherein the instructions to construct the interactive walkthrough comprise instructions that cause the processor to:

determine a current context of the user interacting with the user interface; and generate, during execution of the user interface, instructions to display through the interactive walkthrough based upon the current context.

14. The computing system of claim 13, wherein the instructions to construct the interactive walkthrough comprise instructions that cause the processor to:

generate an instruction by summarizing content within a documentation topic corresponding to the current context.

15. The computing system of claim 14, wherein the instructions comprise instructions that cause the processor to:

determine a new context of the user interface based upon user interaction with the user interface;

construct one or more new instructions to include within a new interactive walkthrough by summarizing content within documentation topics corresponding to the new context; and execute the new interactive walkthrough.

16. A computer-implemented method, the computer-implemented method involving a computing device comprising a processor, and the computer-implemented method comprising:

monitoring, by the processor, user interaction with a user interface to detect an occurrence of a condition indicative of the user interaction requiring assistance with a user interface element of the user interface, wherein the condition includes detecting an invalid input into the user interface element;

accessing, by the processor, executable code of the user interface for the user interface element to extract parameters from the executable code of the user interface element, wherein the extracted parameters from the executable code define expected values or valid input values for the user interface element;

evaluating, by the processor, the user interaction and the extracted parameters from the executable code to identify one or more first entity objects;

in response to receiving a query submitted by the user, execute a natural language process upon the query to extract one or more second entity objects by controlling the natural language process to:

identify grammar tokens from the query;

perform part of speech tagging upon the grammar tokens to assign the grammar tokens to parts of speech; and perform lemmatization upon the grammar tokens based upon the parts of speech to create the one or more second entity objects;

querying, by the processor, a documentation database using a combination of the one or more first entity objects and the one or more second entity objects to identify one or more documentation topics that are mapped to the one or more first entity objects and the one or more second entity objects;

ranking, by the processor, each of the one or more documentation topics to determine which document topics provide a solution to the condition, wherein each rank is based at least in part upon a strength of a correspondence between content within each documentation topic to the combination of the one or more first entity objects and the one or more second entity objects; and controlling, by the processor, the user interface to render content of a documentation topic that is selected based upon the ranks of the documentation topics to provide a solution to assist the user interaction;

wherein the solution includes instructions to assist the user to correctly interact with the user interface element and identify the expected values or valid input values for the user interface element.

17. The computer-implemented method of claim 16, further comprising:

identifying a current context of the user interface;

rendering a feedback interface for receiving feedback from the user regarding the user interface element, wherein the feedback interface is populated with a feedback solicitation statement constructed based upon the current context; and in response to receiving feedback through the feedback interface, transmitting the feedback over a network to a remote computing device.

18. The computer-implemented method of claim 16, further comprising:

selecting a set of documentation topics based upon ranks of the document topics exceeding a threshold;

constructing a summary from content within the set of document topics; and providing the summary to the user.

19. The computer-implemented method of claim 16, further comprising:

evaluating content of the document topic to create instructions for performing an action with respect to the user interface element; and providing the instructions to the user.

* * * * *

UNITED STATES PATENT AND TRADEMARK OFFICE
CERTIFICATE OF CORRECTION

PATENT NO. : 11,068,286 B2
APPLICATION NO. : 16/000990
DATED : July 20, 2021
INVENTOR(S) : Gupta et al.

Page 1 of 1

It is certified that error appears in the above-identified patent and that said Letters Patent is hereby corrected as shown below:

On the Title Page

Item (73) Assignee, Line 2, delete "Shores (CA)" and insert -- Shores, CA (US) --, therefor.

In the Specification

In Column 18, Line 19, delete "U.S.C" and insert -- U.S.C. --, therefor.

In Column 19, Line 2, delete "U.S.C" and insert -- U.S.C. --, therefor.

In the Claims

In Column 21, Lines 42-43, in Claim 8, delete "computer readable" and insert -- computer-readable --, therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*